(12) United States Patent
Lemmey et al.

(10) Patent No.: US 10,121,015 B2
(45) Date of Patent: Nov. 6, 2018

(54) MANAGEMENT OF DATA PRIVACY AND SECURITY IN A PERVASIVE COMPUTING ENVIRONMENT

(71) Applicants: Tara Lemmey, San Francisco, CA (US); Stanislav Vonog, San Francisco, CA (US)

(72) Inventors: Tara Lemmey, San Francisco, CA (US); Stanislav Vonog, San Francisco, CA (US)

(73) Assignee: LENS VENTURES, LLC, San Francisco, CA (US)

( * ) Notice: Subject to any disclaimer, the term of this patent is extended or adjusted under 35 U.S.C. 154(b) by 268 days.

(21) Appl. No.: 14/629,436

(22) Filed: Feb. 23, 2015

(65) Prior Publication Data

US 2015/0242648 A1 Aug. 27, 2015

Related U.S. Application Data

(60) Provisional application No. 61/942,852, filed on Feb. 21, 2014.

(51) Int. Cl.
*G06F 21/62* (2013.01)
*G08G 5/04* (2006.01)
(Continued)

(52) U.S. Cl.
CPC ............ *G06F 21/62* (2013.01); *B64D 47/08* (2013.01); *G05D 1/0077* (2013.01); *G05D 1/102* (2013.01); *G06F 21/6218* (2013.01); *G06F 21/6245* (2013.01); *G06F 21/6254* (2013.01); *G06Q 50/188* (2013.01); *G08G 5/006* (2013.01); *G08G 5/045* (2013.01); *H04L 63/0861* (2013.01); *H04L 63/10* (2013.01); *H04L 63/20* (2013.01); *B64C 39/024* (2013.01); *B64C 2201/127* (2013.01); *G06F 17/30* (2013.01); *H04L 2463/101* (2013.01)

(58) Field of Classification Search
CPC ............ G06F 21/6218; G06F 21/6245; G06F 21/6254; G06C 50/188; H04L 63/0861; H04L 63/10; H04L 63/20; H04L 2463/101

See application file for complete search history.

(56) References Cited

U.S. PATENT DOCUMENTS 5,495,412 A * 2/1996 Thiessen ................ G06Q 10/10
705/1.1
6,141,653 A * 10/2000 Conklin ............... G06Q 50/188
705/1.1
(Continued)

FOREIGN PATENT DOCUMENTS

WO WO 2017208226 A1 * 12/2017 ............. G06Q 30/02

OTHER PUBLICATIONS

Peng et al ("A Trust Supportive Framework for Pervasive Computing Systems," Dissertation, University of North Carolina at Charlotte, pp. 1-106).*

(Continued)

*Primary Examiner* — Luu Pham
*Assistant Examiner* — James J Wilcox
(74) *Attorney, Agent, or Firm* — Perkins Coie LLP

(57) ABSTRACT

A method to provide negotiation control to data such that a person or entity can negotiate the use of data gathered beyond what is needed for a particular use by a third party transaction.

27 Claims, 14 Drawing Sheets

(51) Int. Cl.
*G05D 1/00* (2006.01)
*G05D 1/10* (2006.01)
*G08G 5/00* (2006.01)
*B64D 47/08* (2006.01)
*H04L 29/06* (2006.01)
*G06Q 50/18* (2012.01)
*B64C 39/02* (2006.01)
*G06F 17/30* (2006.01)

(56) References Cited

U.S. PATENT DOCUMENTS

| | | | | |
|---|---|---|---|---|
| 6,304,948 B1* | 10/2001 | Motoyama | | G06F 21/80 |
| | | | | 711/144 |
| 6,842,899 B2* | 1/2005 | Moody | | G06F 9/4875 |
| | | | | 718/100 |
| 7,194,442 B1* | 3/2007 | Flanagan | | G06Q 50/188 |
| | | | | 705/80 |
| 7,478,157 B2* | 1/2009 | Bohrer | | G06Q 10/10 |
| | | | | 709/223 |
| 7,685,073 B2* | 3/2010 | Baker | | G06Q 20/02 |
| | | | | 380/277 |
| 8,015,117 B1* | 9/2011 | Lillibridge | | G06Q 20/382 |
| | | | | 705/64 |
| 8,250,025 B2* | 8/2012 | Ferraro | | G06Q 10/10 |
| | | | | 707/602 |
| 8,341,033 B2* | 12/2012 | Porat | | G06Q 30/0601 |
| | | | | 705/26.35 |
| 8,925,054 B2* | 12/2014 | Mays | | H04L 63/0421 |
| | | | | 726/6 |
| 8,959,590 B2* | 2/2015 | Huebler | | G06F 21/44 |
| | | | | 726/4 |
| 8,996,715 B2* | 3/2015 | Roy | | H04L 63/0245 |
| | | | | 709/230 |
| 9,251,216 B2* | 2/2016 | Cormode | | G06F 21/6254 |
| 9,292,705 B2* | 3/2016 | Lemmey | | G06F 21/6218 |
| 9,489,538 B2* | 11/2016 | Vyas | | H04L 63/0421 |
| 9,544,623 B2* | 1/2017 | Chen | | H04N 21/25866 |
| 9,654,476 B2* | 5/2017 | Lemmey | | G06F 21/6218 |
| 9,959,424 B2* | 5/2018 | Bilotta | | G06F 17/30867 |
| 2002/0157112 A1* | 10/2002 | Kuhn | | H04N 21/234336 |
| | | | | 725/113 |
| 2003/0088520 A1* | 5/2003 | Bohrer | | G06Q 10/10 |
| | | | | 705/74 |
| 2003/0188171 A1* | 10/2003 | DeCenzo | | H04H 60/33 |
| | | | | 713/185 |
| 2004/0078340 A1* | 4/2004 | Evans | | G06Q 20/10 |
| | | | | 705/64 |
| 2004/0153908 A1* | 8/2004 | Schiavone | | G06F 21/6245 |
| | | | | 714/712 |
| 2004/0210926 A1* | 10/2004 | Francis | | H04N 7/163 |
| | | | | 725/25 |
| 2004/0254846 A1* | 12/2004 | Byde | | G06Q 10/087 |
| | | | | 705/80 |
| 2004/0254847 A1* | 12/2004 | Preist | | G06Q 10/087 |
| | | | | 705/80 |
| 2004/0268118 A1* | 12/2004 | Bazan Bejarano | | H04L 63/08 |
| | | | | 713/151 |
| 2006/0048224 A1* | 3/2006 | Duncan | | G06F 21/10 |
| | | | | 726/22 |
| 2010/0312706 A1* | 12/2010 | Combet | | G06Q 30/0204 |
| | | | | 705/50 |
| 2010/0313009 A1* | 12/2010 | Combet | | G06Q 30/0204 |
| | | | | 713/150 |
| 2011/0158210 A1* | 6/2011 | Cemper | | H04W 40/20 |
| | | | | 370/338 |
| 2011/0196914 A1* | 8/2011 | Tribbett | | G06F 9/541 |
| | | | | 709/203 |
| 2011/0208862 A1* | 8/2011 | Maffione | | H04L 67/22 |
| | | | | 709/224 |
| 2011/0238482 A1* | 9/2011 | Carney | | G06F 17/30867 |
| | | | | 705/14.36 |
| 2011/0277037 A1* | 11/2011 | Burke | | G06F 21/6245 |
| | | | | 726/26 |
| 2012/0011197 A1* | 1/2012 | Arisawa | | H04L 67/306 |
| | | | | 709/203 |
| 2012/0210119 A1* | 8/2012 | Baxter | | G06F 17/30861 |
| | | | | 713/150 |
| 2013/0060869 A1* | 3/2013 | Davis | | G06Q 50/01 |
| | | | | 709/206 |
| 2013/0091042 A1* | 4/2013 | Shah | | G06Q 40/02 |
| | | | | 705/35 |
| 2013/0111545 A1* | 5/2013 | Sharma | | H04L 63/10 |
| | | | | 726/1 |
| 2013/0160144 A1* | 6/2013 | Mok | | H04W 12/06 |
| | | | | 726/29 |
| 2014/0358629 A1* | 12/2014 | Shivaswamy | | G06Q 30/0201 |
| | | | | 705/7.29 |
| 2015/0039579 A1* | 2/2015 | Clark | | G06F 17/30867 |
| | | | | 707/706 |
| 2015/0111591 A1* | 4/2015 | Hoffberg | | G06Q 10/0631 |
| | | | | 455/452.1 |
| 2015/0170201 A1* | 6/2015 | Tayebi | | G06Q 30/0253 |
| | | | | 705/14.51 |
| 2015/0186674 A1* | 7/2015 | Vyas | | H04L 63/0421 |
| | | | | 726/26 |

OTHER PUBLICATIONS

Kagal—"Trust-based security in pervasive computing environments" Dec. 2001, pp. 154-157.*

* cited by examiner

MANAGEMENT OF DATA PRIVACY AND SECURITY IN A PERVASIVE COMPUTING ENVIRONMENT

CLAIM FOR PRIORITY

This application claims priority to U.S. Provisional Patent Application No. 61/942,852, entitled "MANAGEMENT OF DATA PRIVACY AND SECURITY IN A PERVASIVE COMPUTING ENVIRONMENT" and filed Feb. 21, 2014. The content of the above-identified application is incorporated herein by reference in its entirety.

TECHNICAL FIELD

The present teaching relates to a data processing system, and in particular to managing data privacy and security in a network system that includes a plurality of sensors, processors and other devices used to capture and process personal and private information.

BACKGROUND

Free availability of storage space, existence of large data networks, and multitudes of sensing devices such as cameras, has help to spawn the phenomena of big data analysis. Under this paradigm, people, devices, companies, governments and the like tend collect some data for purposes such as surveillance, usage patterns, mapping, etc., and in the process collect as much extraneous data as possible regardless if the extraneous data is not needed for the particular purpose. For example, in a typical credit card transaction, the cardholder's name, address, credit card number, security pin, are all used to verify the identity of the cardholder for purchase authorization. However, the back end processing system may collect other extraneous data in bulk such as the location where the transaction is made, the IP address of purchase, the network provider, etc. After the data is collected in bulk and the relationships between those data recorded as metadata, data mining applications are often used to process these data and/or metadata to answer specific questions for technical or business reasons.

A concern to many consumers is that copies of these data are re-combined, re-packaged, and/or re-sold to other dealers of data whose particular interests are not aligned with the consumers. Privacy concerns of the original consumer arise when these data are replicated across the vast Internet and its datacenters and become immortalized in the computing cloud. Because of the redundancy of the copies, these data and metadata are very difficult to protect, delete, and to secure via enforcement of data access constraints.

Additionally, data may be obtained from any number of sensing sources such as cameras. For example, a drone flying over a city may be used to gather images of homes and access roads not necessary for basic navigation, but as ancillary data gathering that may be used for purposes other than for flying over the city.

SUMMARY

Embodiments include a security and privacy wrapper configured to prevent the unauthorized usage of data beyond a negotiated purpose. In one embodiment, the security and privacy wrapper is associated with data pertaining to an entity, such as a person, and a set of permissions associated with the entity. The wrapper also contains a set of negotiation instructions used to allow the wrapper to work independently, or in conjunction with other programs, to dynamically negotiate the usage and dispensation of data collected in response to the purpose of the data acquisition transaction requested by the entity and other extraneous data acquired along with the data required by the purpose of the negotiated transaction.

Embodiments include a system configured to negotiate the flow of data over a network responsive to a set of permissions utilized to ensure any extraneous data collected as a result of the transaction is disposed of according to a negotiated transaction protocol. The system is designed to intercept data used for an intended purpose by a person or entity, determine whether there is any extraneous data collected along with the transaction, negotiate the dispensation of the extraneous data, and negotiate and manage the use and dispensation of the transaction data required to perform the transaction.

Embodiments include a data storage monitoring system configured to intercept data for storage, analyze the data to determine whether the data to be stored includes a security data wrapper. If the data contains the wrapper, then dynamically negotiating a storage schema based upon a predetermined storage protocol associated with a user or entity. The system also, uses the wrapper to determine what data may be retrieved (read), from the storage system and other parameters such as the expiration of the stored data, number of copes that made be made, locations where the data may be stored within the storage system, type of encryption, type of uses for the data, whether to partition or destroy extraneous data, and the like.

Embodiments include a method and system configured to determine how data collected from an entity or person may be combined with other data. In one configuration, a sentry code is used to analyze the data, determine a set of recombination permissions, then use the permissions to either allow or prevent the collected data from being combined with data from other data repositories.

Embodiments for solving the privacy concerns of personal/private data and metadata are disclosed herein from a data processing architecture perspective and digital rights management. The problem of inability to practically protect private data is resolved by an architectural change to a data platform of collecting, processing, distributing, data mining, and storing data in such a way that private data cannot be rediscovered from stored or shared data. Unlike conventional methodology of privacy policy enforcement from the data accessing end, such as a policy based on encryption or data access authentication, the stored data under this architecture does not in fact store the private information in the first place. The architecture includes a data tag module that wraps all new data blocks generated such that a deletion policy and a pipeline policy follows the data blocks from its birth. Once data is collected, the data blocks are piped through question components generated through a question generator module. Each question component includes intelligent code to calculate and manipulate the data block to answer a particular question. Once answered, an answer data block is generated. The answer data block can also be wrapped by the data tag module. The answer data block can be further processed by other question components. The architecture ensures that, at all exit points of the data processing architecture, only answer data blocks are allowed to leave. Exit points include: a data block being saved to persistent storage, a data block being shared, a data block being replicated, a data block being published, a data block being accessed.

Embodiments include a method and system for regulating the use of data accessed on the internet. In one configuration from a data trafficker device collects and/or records a raw dataset in text, audio, and/or photographic format. Then interested parties to the raw dataset are identified, wherein an interested party is the subject matter of the raw dataset, or has an ownership interest or regulatory rights in the raw dataset. Next, negotiation policy executable code is attached to the raw dataset including a set of configured parameters. Next, an autonomous negotiation is initiated with a requesting party seeking use of the raw dataset, wherein an autonomous negotiation comprises an investigation and response process according to the set of configured parameters to permit the requesting party access and use of the raw dataset based upon results of the investigation and response process. Finally, a permitted use verdict is issued to the requesting party.

Variations on the method and system include the use of an obfuscated query and answer process according to the set of configured parameters to permit the requesting party access and use of the raw dataset based upon results of the obfuscated query and answer process and where an obfuscated query and answer process includes posing verification queries before negotiating terms of raw dataset use. Embodiments of the verification queries include framing negotiation queries to elicit desired answers without revealing the desired query.

Some embodiments have other aspects, elements, features, and steps in addition to or in place of what is described above. These potential additions and replacements are described throughout the rest of the specification.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1A:
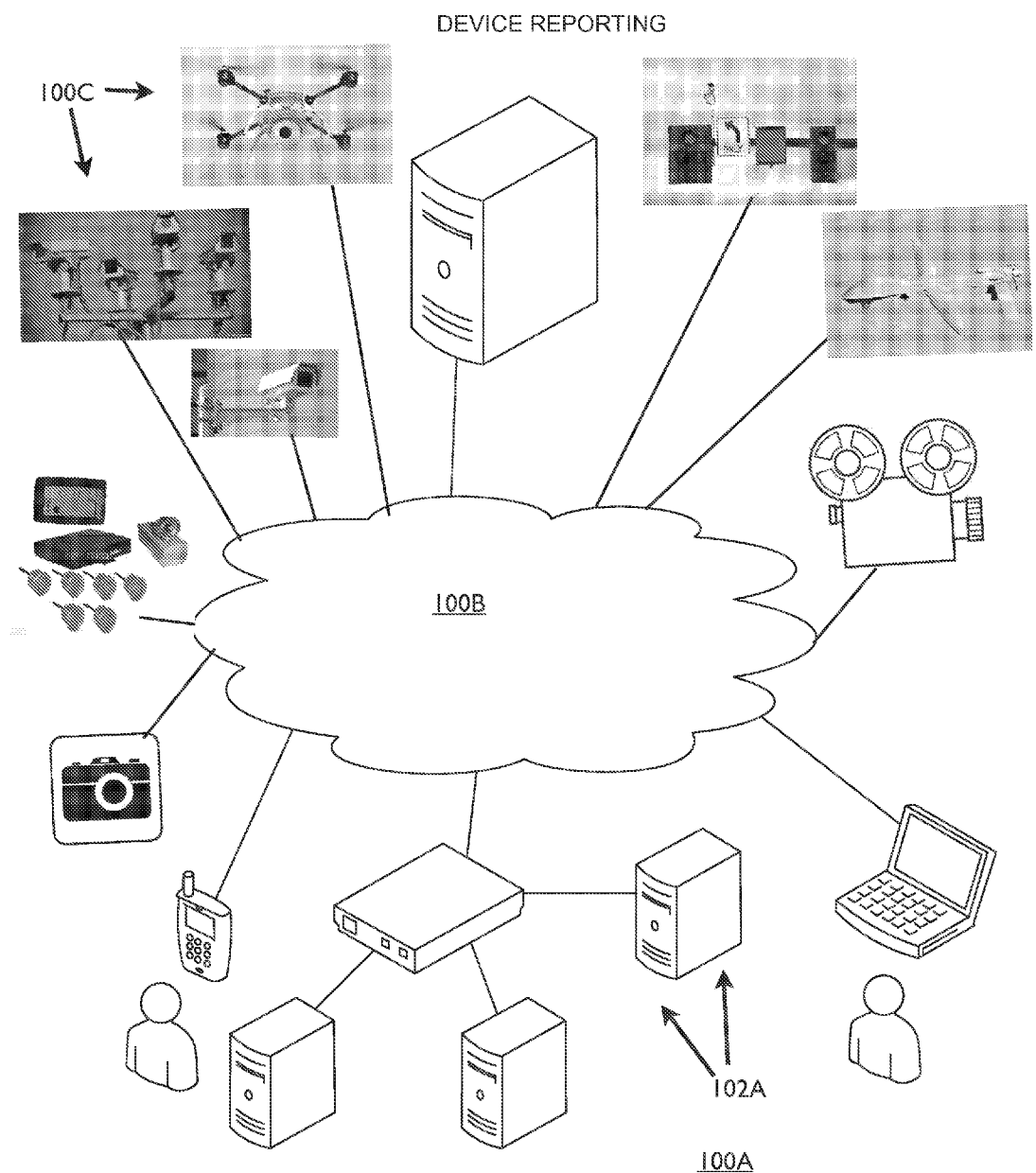
FIG. 1A illustrates a block diagram of a data collection system over a network in accordance with some embodiments.

FIGS. 1A-1D describe different ways data is generated or first recognized by a data collection system 100A. FIG. 1A illustrates a block diagram of a data collection system 100A over a network 100B. For example, network adaptors 102A can be Ethernet adaptors, WiFi adaptors, and the like, and may be other systems and devices 100C capable of gathering data such as touch devices, cable modems, dial-up modems, satellite communication transceivers, optical links, optical fiber interfaces, cameras, drones, sensors, camera arrays, microphone arrays, infrared sensors, audio sensors, temperature sensors, body imaging devices, activity sensors, accelerometers, radar detectors, sonar, surface tension sensors, weight sensors, mobile phones, smart phones, vibration sensors, camera/projector detection systems, global positioning devices, location transmitters, beacons, location lighting, or any combinations thereof.

Figure 1B:
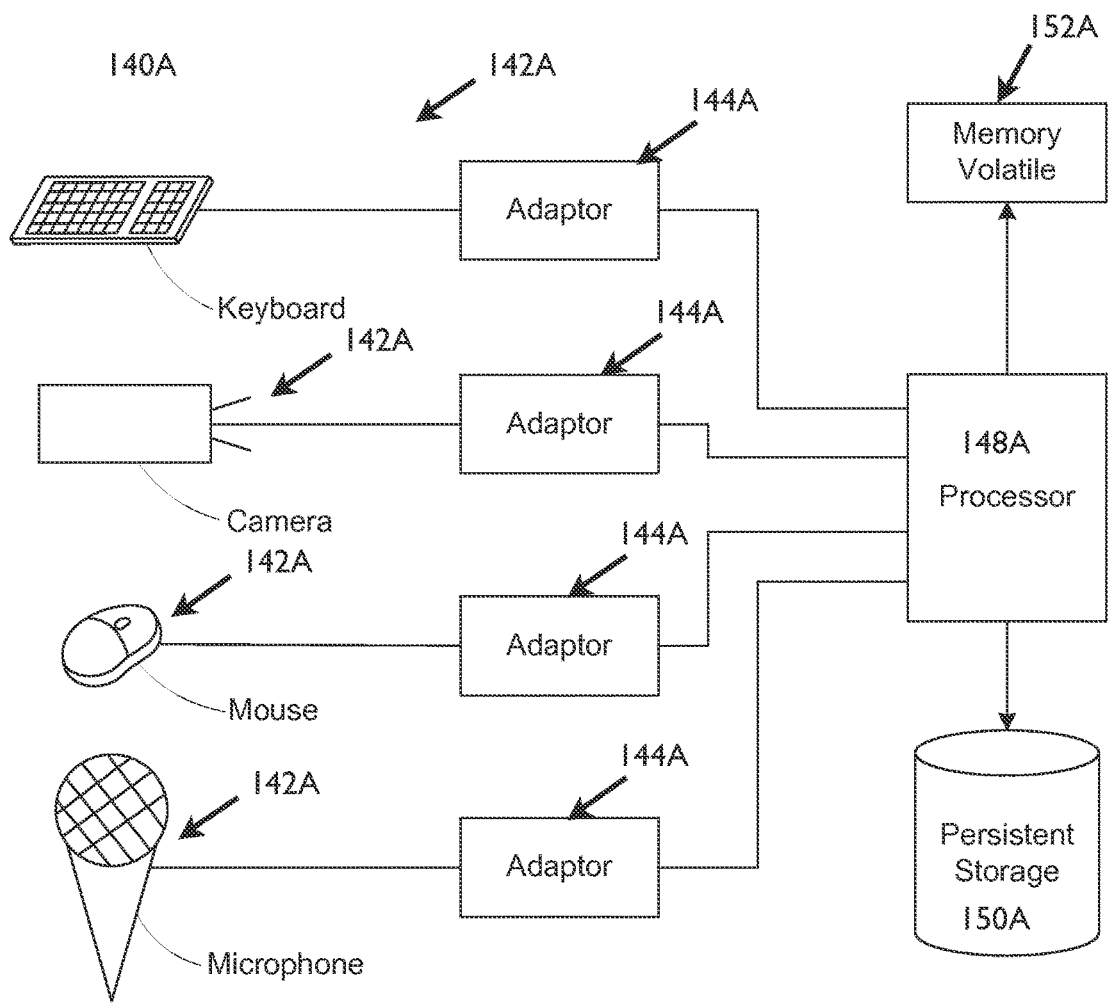
FIG. 1B illustrates a block diagram of a data collection system in accordance with some embodiments.

FIG. 1B illustrates a block diagram of a data collection system 140A at hardware level. The data collection system 140A includes input hardware devices 142A. The input hardware devices 142A are electronic devices for capturing data via sensors. For example, the sensors can be mechanical sensors, electromagnetic sensors, temperature sensors, chemical sensors, pressure sensors, or any combination thereof. Specifically, the input hardware devices 142A can be computer pointing devices, computer keyboards, cameras, microphones, scanners, telephones, and may be systems and devices such as touch devices, cable modems, dial-up modems, satellite communication transceivers, optical links, optical fiber interfaces, cameras, drones, sensors, camera arrays, microphone arrays, infrared sensors, audio sensors, temperature sensors, body imaging devices, activity sensors, accelerometers, radar detectors, sonar, surface tension sensors, weight sensors, mobile phones, smart phones, vibration sensors, camera/projector detection systems, global positioning devices, location transmitters, beacons, location lighting, or any combination thereof.

The input hardware devices 142A are connected to their respective hardware input adaptors 144A. The hardware input adaptors 144A are hardware interfaces to the input hardware devices 142A. The hardware input adaptors 144A report data streams or data blocks in the form of a raw dataset 146A from the input hardware devices 142A to a processor 148A. The processor 148A can then decide on how to further process the raw dataset 146A, and whether the raw dataset 146A is to be saved onto a persistent storage 150A or an unrestricted volatile memory space 152A.

Figure 1C:
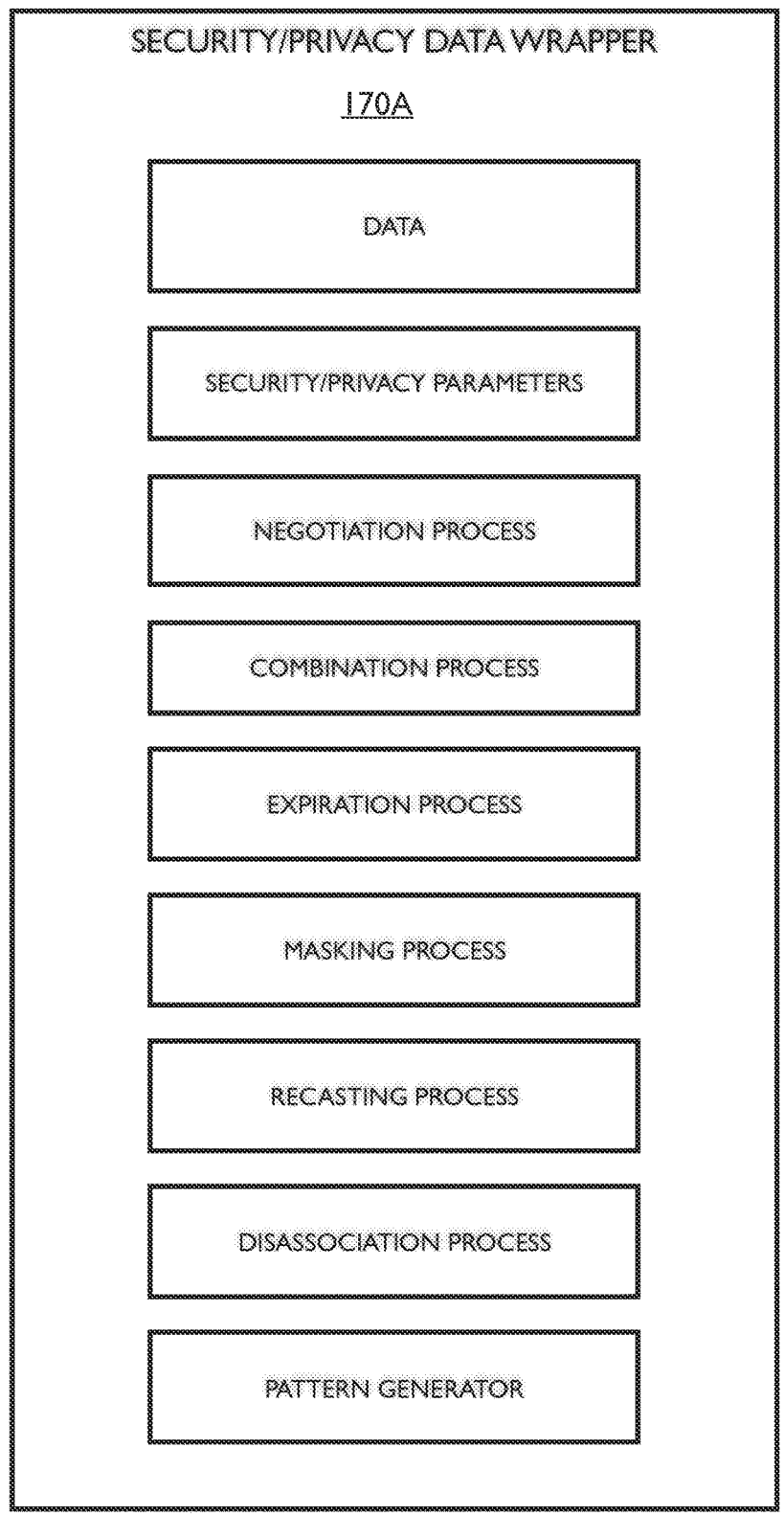
FIG. 1C illustrates a block diagram of a security/privacy data wrapper in accordance with some embodiments.
Figure 1D:
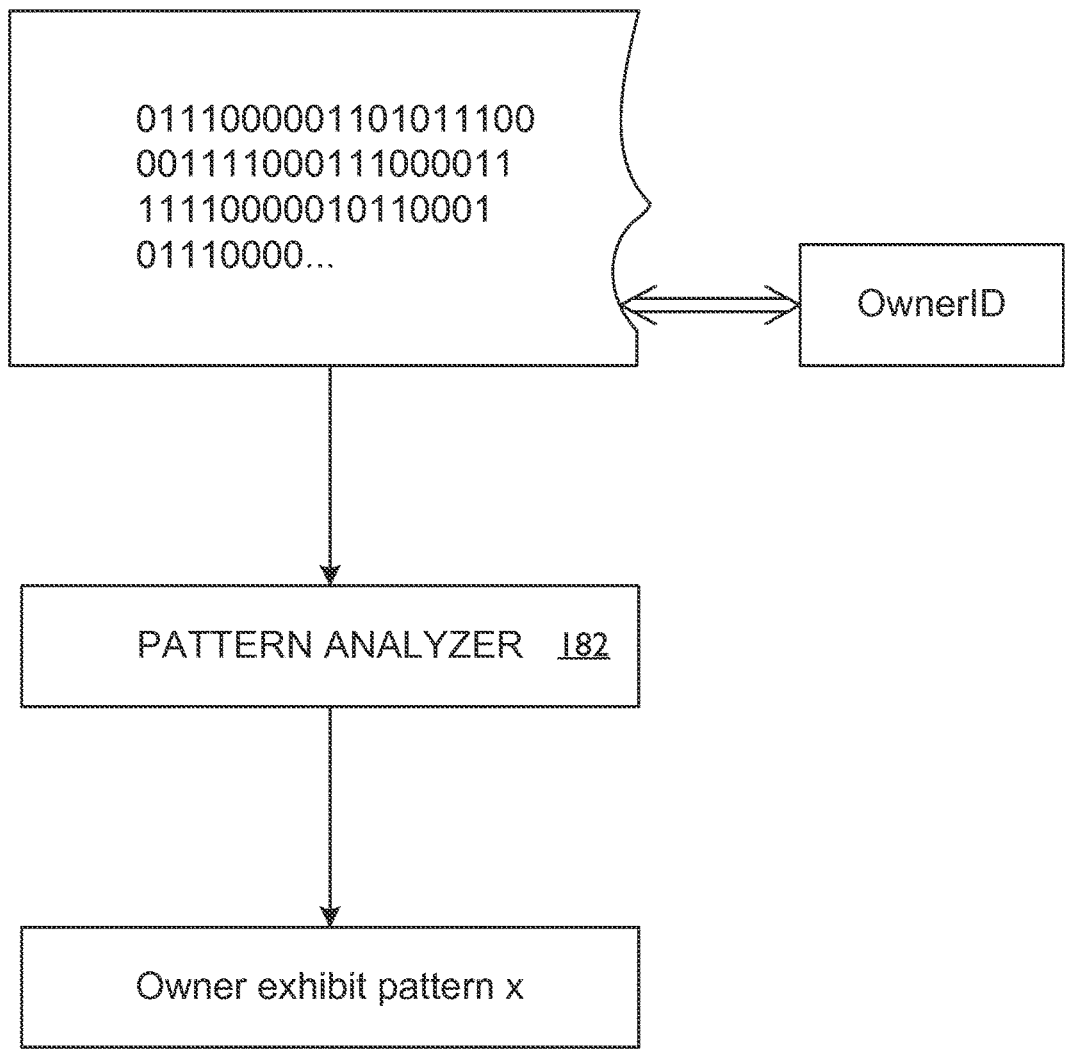
FIG. 1D illustrates a block diagram of a data marking and tagging system in accordance with some embodiments.

FIG. 1C illustrates a block diagram of a security/privacy data wrapper 170A, herein referred to as "data wrapper". At a general level, a data wrapper may be understood as a form of metadata. In other words, data (in the form of program, script, code, instruction, permission, container, symbol, or other type information or the like) associated with the underlying personal and/or sensitive data for which security and/or privacy is sought. According to some embodiments, a data wrapper may be a script or sequence of instructions to be carried out by another program. According to other embodiments, a data wrapper may, in the context of the transmission of data be understood as a "stream" wrapper. In such embodiments, the stream wrapper may be data placed in front of or around a transmission or stream of underlying data that may provide information about or restrict access to the data being transmitted. For example, in the context of transmission of data over a packet-switched network, a stream wrapper may be data in the form of a header and trailer around the encapsulated payload data within a digital transmission unit (for example, a data packet or frame). According to other embodiments, a stream wrapper may be understood as a "stream transformation." A stream transformation may transform a stream of initial data through the use of hardware and/or software implemented algorithms into a stream of new data.

In one embodiment, the data wrapper 170A is software configured to "wrap" data associated with a person, entity, and the like. The data wrapper may include security/privacy parameters, negotiation module, combination module, expiration module, masking module, recasting module, dissociation module, pattern analyzer, and the like. The security/privacy parameters are associated with the rights, permissions, and other indicia used to define and indicate the security and privacy parameters related to the person's data privacy and security requirements. In other embodiments, the security/privacy parameters include one or more levels of negotiable privacy and security parameters. For example, the security/privacy parameters may include permissions to copyrighted material and the use or sale thereof to third parties. In other examples, the security/privacy parameters may include use cases for certain data, such as personal data associated with a person's social security number, body type, weight, address, age, fingerprint identification, and other data personal to the person.

In other embodiments, data wrapper 170A includes a negotiation module. The negotiation module may be used to negotiate with data collection devices such as described above, in order to negotiate what data may be collected, transmitted, and retransmitted by the device. The negotiation module may be software or a combination of hardware or software modules. The negotiation module may also be configured from an artificial intelligence (AI) such that the negotiation module actively negotiates with devices such as the data collection devices described herein, to act as an advocate on behalf of the person or entity. In one embodiment, such AI is configured to negotiate at various levels of permission to determine the dispensation of data used for a transaction and extraneous data collected in one or more ancillary processes associated with the collection of the data. For example, the AI may be configured to distinguish a request for an address for credit card verification, with the request for a purchase location, such that the credit card request would be limited to a minimal subset of collection to verify the transaction. For location identification, the AI could distinguish the need for a delivery address from the credit card verification to provide sufficient information to the delivery services to find and deliver the purchased goods. In other embodiments, the AI may be configured to distinguish the need for a location for delivery for a product, from delivery of a service that does not require a location for delivery.

In other embodiments, data wrapper 170A includes a combination module. The combination module may be used to negotiate with data collection devices such as described above in order to determine what data may be collected and shared between devices and systems. For example, the combination module may allow two or more types of personal data to be combined to present to a doctor for a medical procedure, but not allow the data to be combined for a marketing campaign. In other examples, the combination module may be used to prevent or inhibit data mining operations from occurring on extraneous data. In this scenario, the combination module may be configured to detect combinations, that when combined, meet a data mining profile threshold. In one example, the combination module would not allow data collected for a transaction associated with a person buying a dress to be combined with metadata history of online shopping from other online shopping databases, to determine whether the person was a man or woman.

In other embodiments, data wrapper 170A includes an expiration module. The expiration module may be used to establish the expirations limits of data collected from a person or entity. For example the expiration module may be configured to determine from the negotiation parameters how long data should be allowed to be used before either being destroyed, converting to an encrypted form, removed from memory, redacted, and the like. In one example, the expiration module receives metadata pertaining to a person's birthdate and tags the birthdate data with a label that only allows such birthdate date to last for the time duration of a purchase transaction, or time limit, which ever is least. The expiration module may also be used to set an expiration time or date on other extraneous data collected such as the temperature of a room or area that is being inhabited by a person. Such expiration limits may be used in conjunction with the other processes such as the combination module to allow data to be combined for example, over a predefined time limit.

In other embodiments, data wrapper 170A includes a masking module. As with the expiration module, the masking module may be used to establish the viewing or data processing limits of data collected from a person or entity. In the masking module, the data is "masked" for a specified window of time, which could be indefinitely. Such a masking module may be used in scenarios where for example, a person's fingerprint or other biometric data is used to start a process or unlock a device such as a computer. Such masking may be configured with a hash code that distorts or otherwise prevents data collection devices from perceiving the data they would normally be able to detect. For example, a fingerprint scanner may be configured to detect the lines of a fingerprint. However, the masking module may be configured to mix random numbers or other data such as white noise with the data in a data hash in order to mask the output of the fingerprint device from third parties. This masking could be used by security personnel for example to prevent thieves from taking photographs of fingerprints or other biometric data.

In other embodiments, data wrapper 170A includes a recasting module. As with the expiration and masking processes, the recasting module may be used to establish the viewing or data processing limits of data collected from a person or entity. The recasting module may add specified data to the personal data in order to "recast" the data being used by third parties to prevent data mining, or to make the data retrieved unusable. For example, if a woman buys a dress from an online shopping store, the recasting module may recast the purchase data as some other type of data, e.g., temperature data. The data looks valid, but will not provide accurate data results for data mining purposes. In other embodiments, the recasting module may be used to infer one type of data has been received, when actually other data is received. For example, for a surreptitious program counting the number of keystrokes to determine keyboard usage, the recasting module may be configured to add hundreds of mouse clicks to the data in order to overwhelm and detract from the data collection process.

In other embodiments, data wrapper 170A includes a disassociation module. The dissociation module may be used to change data that could be associated to data that is disassociated. For example, consider the case where a person orders a book from an online shopping store. The data that is collected such as the name, address, credit card number may be used to complete the purchase transaction, but when a data mining system tries to use the data, the data is altered such as with the recasting module to keep the data from being associated by third party systems. For example, the date of purchase being collected may be reset by the disassociation module to look like a different date, the address may be modified to look like a different address, etc. In one embodiment, the dissociation module is proportional to the amount of extraneous data collected. In other words, the more extraneous data that is attempted to be collected the more disparate the data becomes with respect to third party systems. In this scenario, the data being collected for used for the purpose of the transaction may be verified and non disparate, whereas the data collected by third party data mining systems would be more disparate and unusable with respect to the person or entity associated with the data.

In other embodiments, data wrapper 170A includes a pattern generator, embodiments of which are described herein. The pattern generator may be used to seek out and detect watermarks, metadata, and other data patterns used by the data wrapper and the security system in order to detect the data wrapper, and to label the data with the negotiation parameters. For example, the pattern generator may be configured to work in conjunction with a pattern analyzer as described herein to detect rotating vector data configured to change per transaction. Such data may then be used to prevent data mining process from circumventing the security and privacy protocols and parameters. Such pattern generator may be used as part of the recasting module by translating one form of data pattern to another. The pattern generator may also be used to detect encrypted keys used to identify specific types of data. For example, biometric data such as DNA may be combined with other data to create a hash data label. The hash data label may then be used and decrypted by the pattern analyzer described herein to validate the DNA data in a manner that changes as a function of the change in DNA sequence.

FIG. ID illustrates a block diagram of a data collection system 180 by generating and storing metadata based on data analysis. The data collection system 180 includes a pattern analyzer 182. In one embodiment, an owner ID is combined with the data to form security data wrapper 170A. The owner ID may be a unique ID, such as an encrypted file, that is a combination of personal data and other data unique to the person or entity. Such an owner ID may also contain the negotiation parameters or be tied to a contract or other document that indicates the person's data utilization criteria and negotiation parameters. For example, the owner ID may be linked to a terms of service that stipulates the owner's intended use for the data being transmitted, the expiration date or time, data recombination criteria, monetary information for data use, and the like. The owner ID may also be used as a virtual watermark that may be used to detect violation of the agreements associated with the owner ID. The owner ID may be configured as metadata that is attached to the data being transacted, be a pointer used to direct the data flow to a particular data rights management system, may include a digital key to lock and/or unlock an encrypted storage location, may be part of one or more header files used in packet transmission, and the like.

Figure 2:
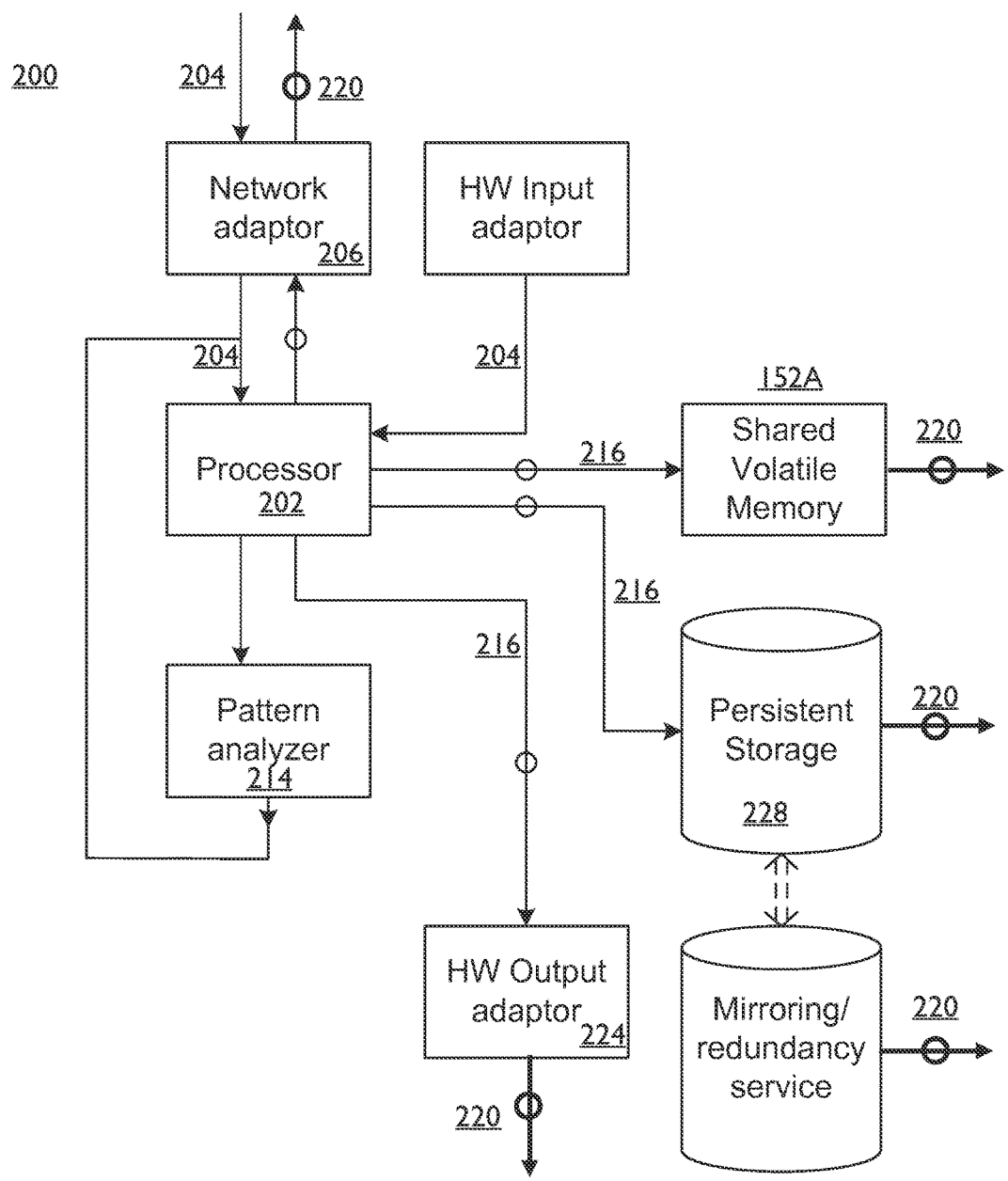
FIG. 2 illustrates a control flow of a data processing architecture in accordance with some embodiments.

FIG. 2 illustrates a control flow of data processing architecture 200. The data processing architecture 200 includes a processor 202. The processor 202 receives data inputs 204 from a variety of sources. The exit points of collected data are marked by an outgoing arrow with a circle As illustrated by FIGS. 1A-1D, for example, the processor 202 can receive inputs from a network adaptor 206, such as the network adaptors 102A of FIG. 1A, a hardware input adaptor 210, such as the hardware input adaptors 144A of FIG. IB, or a pattern analyzer 214, such as the pattern analyzer 182A of FIG. ID.

Under the data processing architecture 200, once the data inputs 204 are processed into a processed data 216. Further use, including but not limited to alteration, storage, processing, and/or movement of the processed data 216 is restricted. This restriction can be governed either by a data wrapper (for example the data wrapper 170 of FIG. ID) tagged when the data inputs 204 are first received and/or by data processing applications executed by the processor 202. In particular, the restrictions may be triggered at output channels 220 from the data processing architecture 200, such as the network adaptor 206, a hardware output adaptor 224, the volatile memory space 152A, or a persistent storage 228. The network adaptor 206 can be one of the network adaptors 102 of FIG. 1A. The hardware output adaptor 224 is a hardware interface to an output device, such as a printer, a display, a fax, or any combination thereof. The volatile memory space 152 is a volatile memory that is shared between applications that are executed on the data processing architecture 200. The persistent storage 228 is a storage device capable of storing data indefinitely even without power, such as the persistent storage 150A of FIG. 1B.

Figure 3:
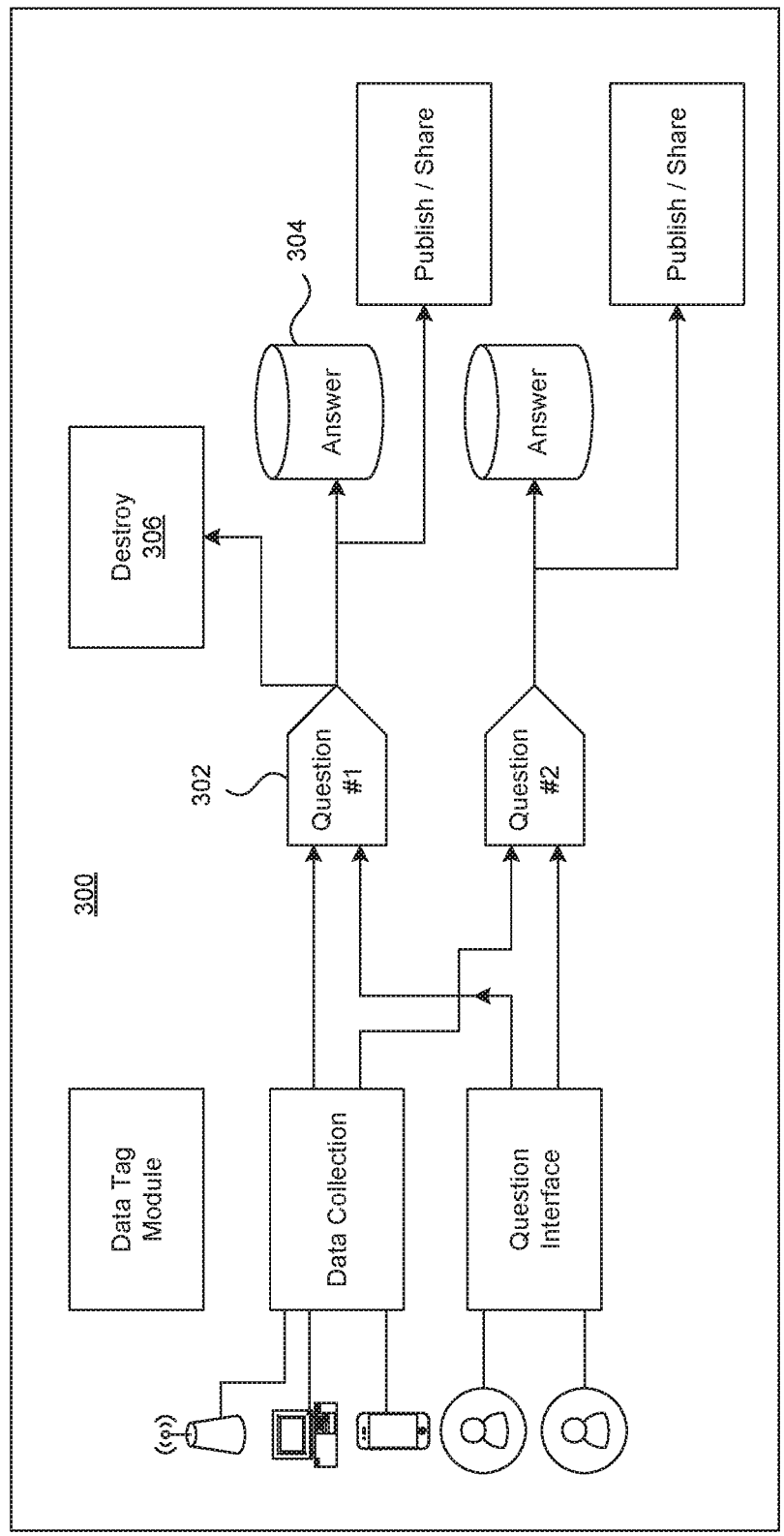
FIG. 3 illustrates a block diagram of a privacy-aware data processing architecture in accordance with some embodiments.

FIG. 3 illustrates one embodiment of a digital rights management process 300 incorporating the use of the data wrapper to direct the flow of data and negotiations. In this embodiment, negotiation parameters and data usage parameters are defined in the form of questions and answers. Such questions and answers allow the data to be used for example, for publication or sharing according to a negotiated agreement between the person or entity associated with the data, and third parties. For example, consider the case of a shopping transaction that involves the use of a credit authorization associated with a sale of an automobile. In order to determine if a buyer has sufficient credit, the data wrapper may contain the stipulations that only the last four digits of the person's social security number may be used in authentication. However, the third party may need the last six digits of the person's social security number. The process 300 may be configured to negotiate the usage of the additional two numbers. For example, question #1 302 may be, "may we have the additional two numbers of the client's social security number?" the answer may be "why" 304, the process 300 may reply, "as that is the minimum number needed for the verification process", the reply from the wrapper may be "only if you use the digits for this one transaction", the process 300 may reply, "OK". Thus, a negotiation process has been complete and the transaction is processed. Other scenarios are contemplated. For example, as negotiations may exceed the system capacity or authorization ability, the person undergoing the transaction process may be alerted that the process requires more input or a decision from the person. As the person may not understand the ramifications of the transaction and negotiation to their rights, the system 300 may also enlist additional resources such as a human advocate to assist in the third party transaction on behalf of the person via for example, a question interface. Thus, unlike traditional terms of service agreements and transactions that cancel the transaction unless all the terms are agreed to, system 300 dynamically negotiates the terms that allow the person or entity to vary the terms according to their preferences. In one embodiment, if the negotiation includes a clause for destruction of data, the system 300 sends the data to a destroy process 306 in order to permanently destroy the data once the transaction is completed according to the agreed upon negotiations.

In other embodiments, the negotiations may extend to the data required to complete a transaction as well as to additional data collected. For example, if the data collection needed to complete the transaction is a pin code, then other data collected such as IP address, location, time, etc., could be negotiated as well according to the negotiation parameters. In one example, if the negotiation terms were set to destroy such extraneous data, the data would be destroyed. However, the person may agree to have the extraneous data used for another purpose such as for charity. The extraneous data would then be used for such agreed upon purpose. If the data was used for other purposes, then a breach of the agreement could be set to fine the third parties using the data outside the agreement. Such fines could be used as a control mechanism for data mining and other surreptitious activities. The fines could also be set up as payments directed to fund third parties. For example, a fine could be redirected to a charity organization. Thus, such penalties could be used as part of the negotiation to have the data mining organizations pay for such data to gain access or as a fine to deter such behavior.

Figure 4:
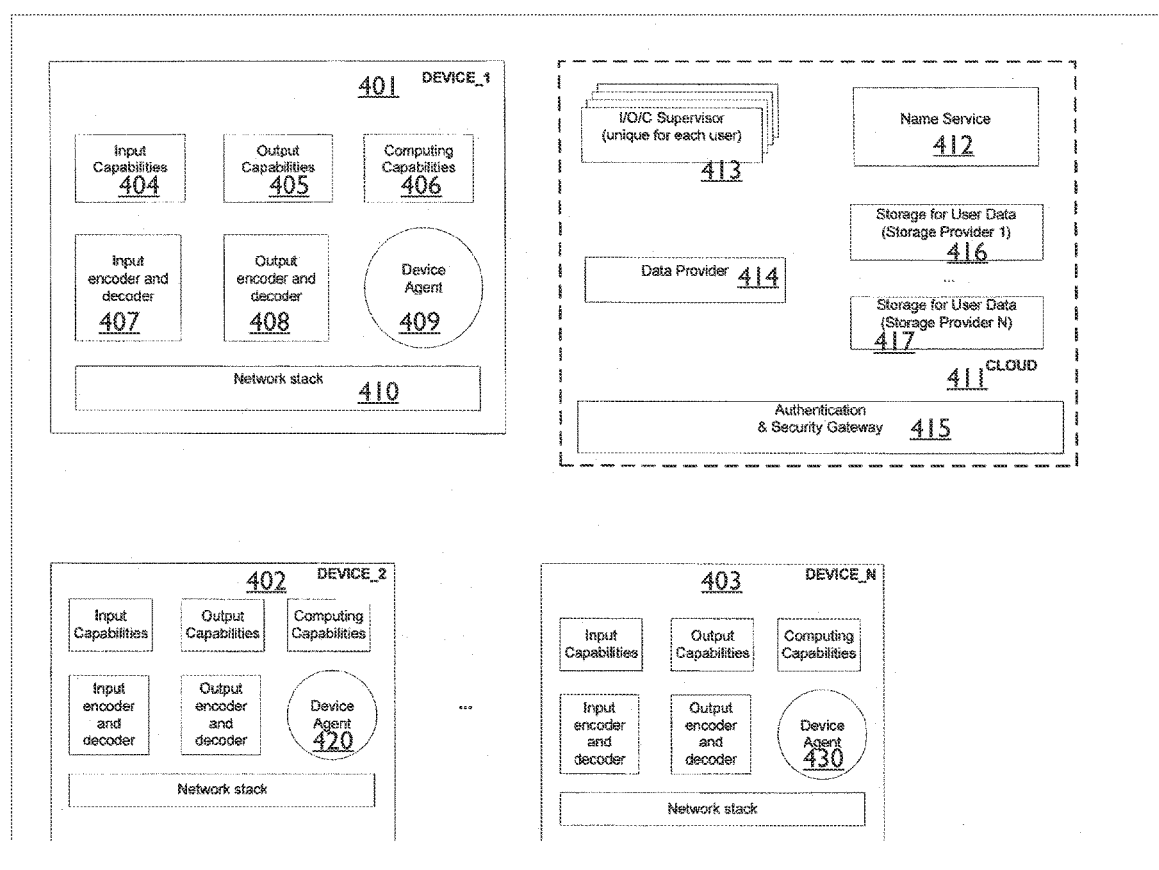
FIG. 4 illustrates a device for use with a privacy-aware data processing system in accordance with some embodiments.

FIG. 4 is an exemplary system level diagram of a pervasive computing environment 400 utilizing a server, according to one embodiment. In one embodiment, pervasive computing environment 400 has a cloud 411 and one or more devices (device_1 401, device_2 402, device_N 403). A device_!401 can have input capabilities 404, output capabilities 405, computing capabilities 406, an input encoder and decoder 407, an output encoder and decoder 408, a device agent 409, and a network stack 410. A device, according to one embodiment, can have any combination of the referenced components and is not required to have all of them. A cloud 411 has a supervisor 413 (referred to as an I/O/C supervisor, for input, output, and computing), a name service 412, a data provider 414 in communication with storage providers (416, 417), and an authentication and security gateway 415.

In one embodiment, device agent 409 is configured to act as a negotiation agent to employ the data wrapper. The device agent 409 may be configured to negotiate with the authentication and security gateway 415. In this embodiment, the device agent 409 employs the protocols discussed herein to manage the data being sent to and from the various devices 401, 402, and 403. The respective devices agents may be configured to negotiate between each other and the authentication and security gateway 415. For example, device_2 402, via its device agent 420 may request, via cloud 411, a specific set of data 490 from device_!401. During negotiation with device agent 420 through the authentication & security gateway 415, device agent 409 may request highly-restrictive data usage terms to be included in a data wrapper (for example a data wrapper similar to the data wrapper 170A of FIG. 1C) associated with data 490. In order to determine whether the data usage terms requested by device agent 409 of device_1 401 will work for its own purposes, device agent 420 of device_2 402 may need to negotiate with the device agent of a third party device, for example device agent 430 of device_N 403.

In order to further illustrate the embodiment described above consider the following scenario. An individual person requests via a smart phone (in this example, device_1 401) to purchase a product from an online retailer. The online retailer server device (in this example, device_2 402) requests: 1) the person's shipping address, 2) the person's billing address, and 3) the person's credit card information. In response to the request form the online retailer's server, the device agent of the smart phone (in this example, device agent 409) requests that if sent, such data be subject to a data wrapper containing restricted usage terms. For example: 1) that the data sent be stored only on the online retailer's server (device_2 402), 2) that the data stored on the online retailer's server device be deleted immediately following completion of the transaction, and 3) that the data never be transferred in any way to a third device. Following this request from the device agent for the iPhone (device agent 409), the device agent for the online retailer server (device agent 420) analyzes the internal transaction processing systems and procedures of the online retailer. This analysis reveals the following, 1) the person's data may need to be stored on multiple physical devices within the online retailer's system due to, for example, redundancy and/or mirroring functionality, 2) in order the transmit the data, the data my be transmitted through and stored on the devices of a third-party cloud computing service (in this example cloud 411), and 3) in order to complete the transaction, the online retailer must transmit the person's billing address and credit card information to a third-party credit card company for payment verification. The device agent for the online retailer server (device agent 420) returns this information to the device agent for the person's smart phone (device agent 409) with a request that the device agent for the smart phone modify its stipulated restricted usage terms contained within the data wrapper. With the goal of effectuating the transaction, the device agent for the smart phone (device agent 409) agrees to modify the terms to 1) allow storage on multiple physical devices within the online retailer's system only were necessary, and 2) allow transfer to a single third party device for the limited purpose of transmission and payment verification as long as the third-party device is made aware and complies with the restricted usage terms as negotiated between the device agent for the smart phone (device agent 409) and the device agent for the online retailer's server device (device agent 420). This second request, that the third-party device comply with negotiated restricted usage terms, will in turn necessitate a similar back and forth negotiation between the device agent for the online retailer's server device (device agent 420) and the device agent for the credit card company's server device (in this example, device agent 430) and the device agent for the online retailer's server device (device agent 430) and the authentication & security gateway for the cloud computing service (in this example, authentication and security gateway 415). Once the multiple devices and the cloud computing service arrive at an acceptable set of restricted usage terms, the device agent for the smart phone (device agent 409) may incorporate the agreed-to terms into a data wrapper and functionally combine the data wrapper with the data to be transmitted from the person's smart phone to the online retailer's server device.

As discussed earlier, this negotiation process may take place automatically without any human input according to preset negotiation parameters. The negotiation parameters, however may be dynamic and automatically adjust based on contextual characteristics of the current situation. Contextual characteristics may include, but are not limited to, the nature of the data, the transmission protocols employed along data transmission channels, the security protocols employed along data transmission channels, the geographic location of the sending and receiving devices, as well as intermediary devices along the data transmission channels, the location of data storage systems, the routing path through which the data is to be transmitted over the network (including whether the path will travel over wired vs. wireless physical infrastructure), or any combination thereof.

A human actor may also pre-configure or dynamically configure in near real-time the negotiation parameters. This may be accomplished in a number of ways including, but not limited to, setting detailed permissions for set of likely contexts, or at a higher level providing an overarching directive to a device agent instantiated on a device they are using to apply relatively higher or lower protections when negotiating data use restrictions. For example, using a human Interaction interface (HII) (also known as a "user interface" (UI)), a high-level configuration directive to the device agent may be set by a person using the device simply through the use of a slider bar on a touch screen interface.

In another embodiment, device agent 409 may be configured to enforce the negotiated terms of the data wrapper associated with transmitted data (for example, data 490 mentioned in the previous paragraphs). Consider the illustrative scenario discussed in the previous paragraphs. The smart phone (e.g., device_1 401) has transmitted data 490 (containing the person's mailing address, billing address, and credit card information) to the online retailer's server device (e.g., device_2 402) along with a data wrapper containing a set of data use restriction terms applicable to both the online retailer and other third-parties such as the credit card company and the cloud computing service. In order to enforce the data use restriction terms contained in the data wrapper of data 490, the device agent of the smart phone (e.g., device agent 409) may track the propagation of data 490 among other device connected to the internet. The device agent of the smart phone may accomplish this in number of ways.

According to one embodiment, the device agent for the smart phone may periodically "crawl" the internet for data the same as or similar to the data transmitted as data 490. Current internet search engines employ such technology to scour the internet for documents, index the locations of the documents, and return links to such documents as search results in response to submitted queries.

According to another embodiment, the device agent for the smart phone may include as part of the data wrapper data in the from of a "water mark" or similar recognizable only by the device agent for the smart phone (for example, a continuously changing pattern created by a pattern generator similar to that described in FIG. IC and recognizable by a pattern analyzer similar to that described in FIG. ID).

It will be understood by those having ordinary skill in the art, that the above two embodiments serve only as examples and that there are many other ways in which a software or hardware component may be programmed to seek a particular set of data located on a network or to seek evidence of prior use of that specific set of data via the network.

If the device agent for the smart phone discovers uses of the data 490 that do not comply the data use restriction terms of the original data wrapper, it may enforce the data use restriction terms in a number of different ways.

According to one embodiment, the device agent for the smart phone may automatically notify (through email, text message, or otherwise) the person associated with the data that their data is being used improperly and inform that person as to the details of the improper use.

According to another embodiment, the device agent for the smart phone may automatically notify (through email, text message, or otherwise) a privacy or security regulatory authority and inform that authority as to the details of the improper use.

According to yet another embodiment, the device agent for the smart phone may initiate a process on the data through the data wrapper to curtail the improper use of the data. Processes may include, but are not limited to deleting the data, masking the data, recasting the data, disassociating the data, and or encrypting the data.

Figure 5:
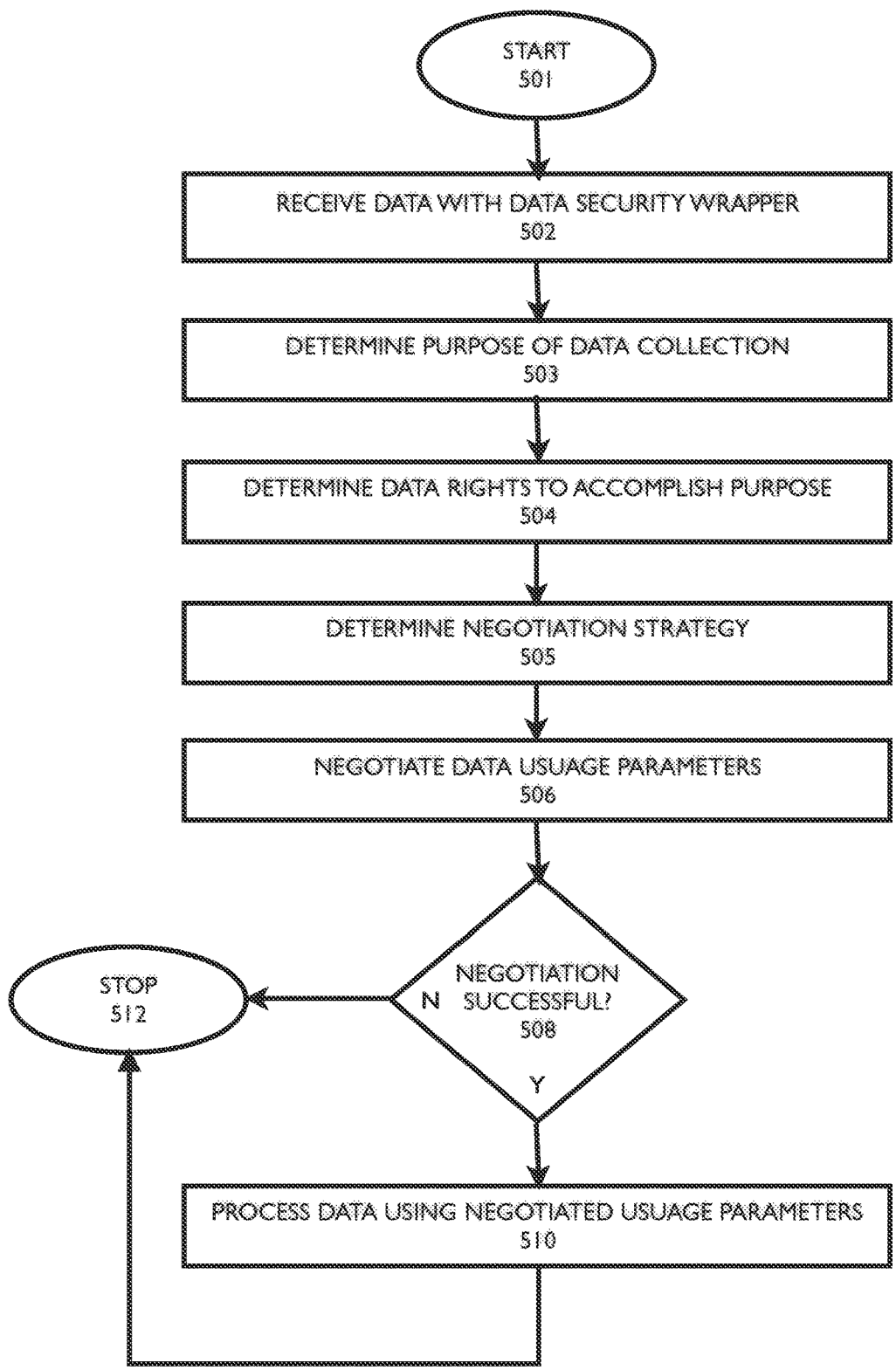
FIG. 5 illustrates a method for privacy-aware data processing in accordance with some embodiments.

According to yet another embodiment, the device agent for the smart phone may track the usage of the data and monetize the improper usage through, for example, automatically demanding a royalty payment from the offending user for continued use of the data. For example, if data 490 was improperly shared with an entity performing targeted advertising, the device agent of the smart phone may negotiate a royalty payment (payable to the person to whom the data belongs) with a device agent of the targeted advertising entity using data 490 for the continued use of the data 490. Again, as described earlier, this may process may occur automatically without any human input, and/or be based on pre-configured or dynamically configured negotiation parameters. FIG. 5 illustrates a method 500 for data collection negotiation. For example, referring to FIG. 4, consider the case where device 401 is a mobile phone with a camera and the phone is being used to purchase an item using a purchase application instantiated on device 401, for example, within the network stack 410. In this scenario, at step 500 the application asks the user of the phone to take a picture of a check for the transaction. Further consider where device 402 is a wireless point access used to convey the transaction data between device 401 and the authentication and security gateway instantiated on cloud server 411. The data from the check is processed on device 401 and is broken into account number, name, address, date, time, and location of transaction. According to the negotiation parameters from the data wrapper at 502 according to the purpose at 503, the IP address of device one may only be used for location verification per the negotiation strategy determined at step 505 and negotiated at step 506. Therefore, if the negotiation is successful at 508, according to the negotiation at 510, as the data is being channeled through device 402, the agent on device 402 prevents the transmission of the IP address to anyone but the purchase authorization unit in communication with the authentication and security gateway 415. In this scenario, the IP address data would only be passed to the gateway, and not stored or used by any other device in communication with the wireless access point 402 (device_2). Further, if the negotiation between the access point 402 and device 401 allows for the IP address to be used to verify the signal strength and wireless commination channel is stable, then device 402 may use the data for a different, but allowed purpose.

Figure 6:
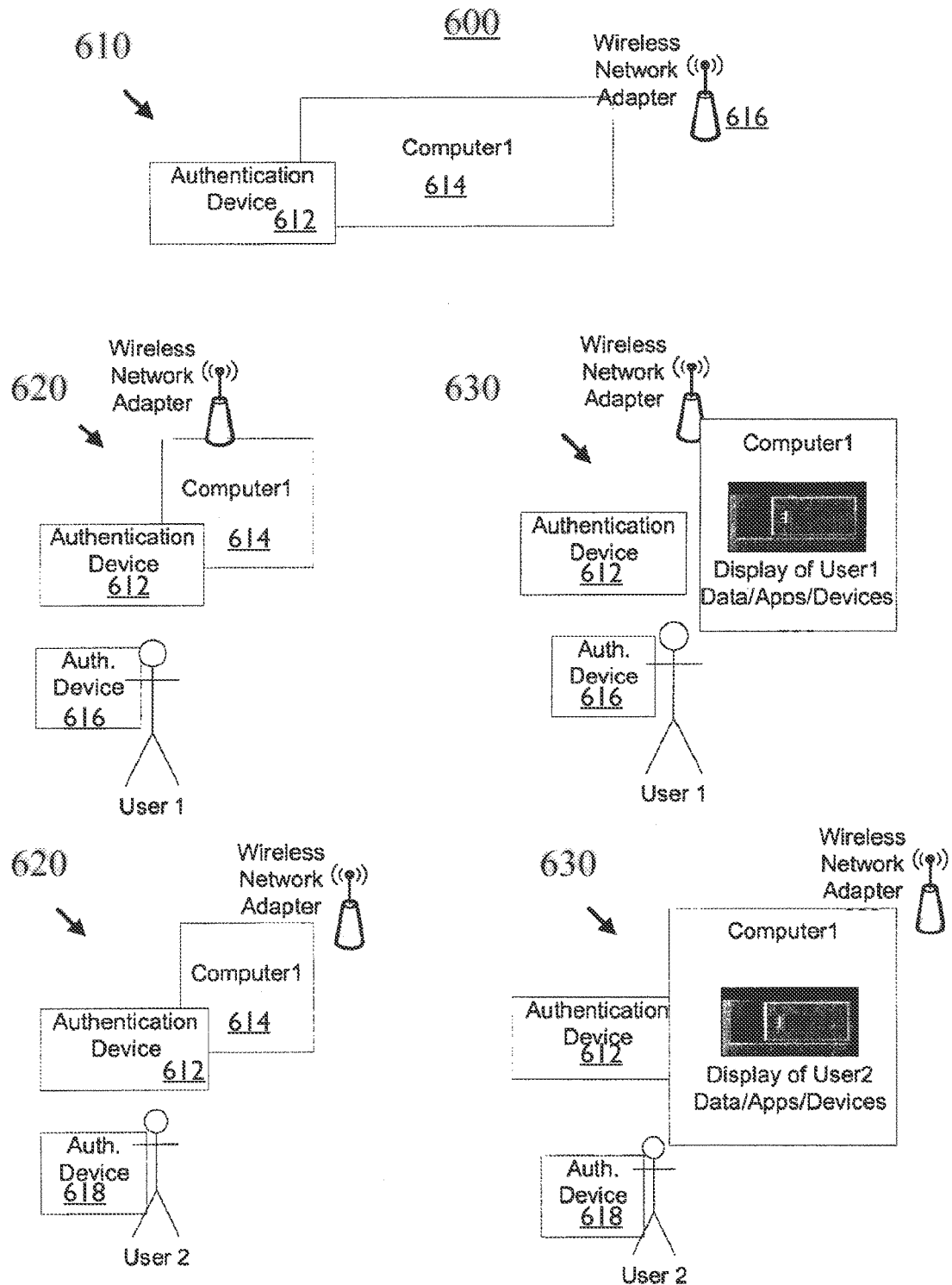
FIG. 6 illustrates a block diagram example of a privacy aware scenario in accordance with some embodiments.

FIG. 6 is an exemplary system level diagram of a pervasive computing environment 600 utilizing a server, according to one embodiment.

Figure 7:
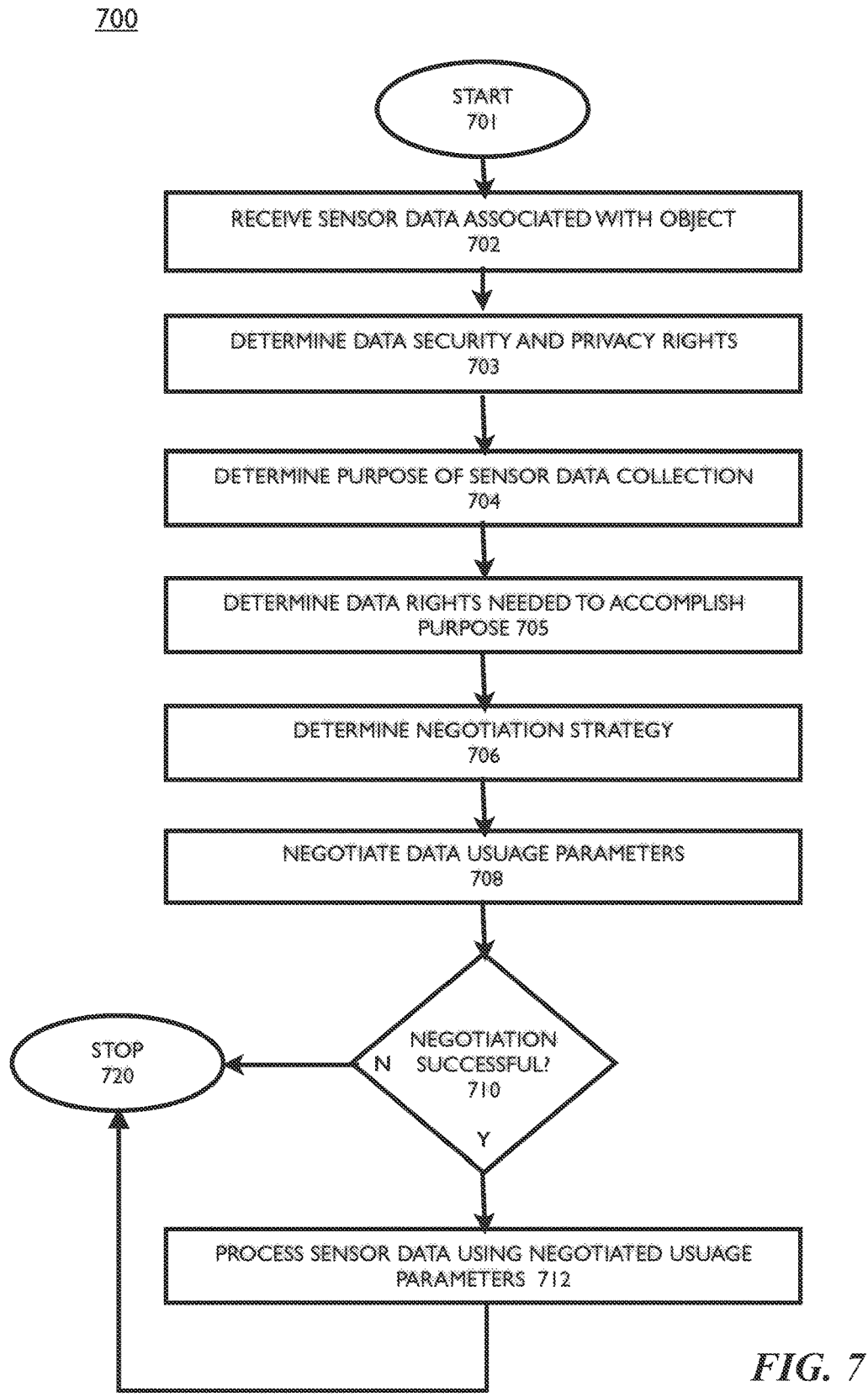
FIG. 7 illustrates a method for privacy-aware data processing in accordance with some embodiments.

FIG. 7 illustrates a method 700 for negotiating the use of sensor data collected by sensors in contact with users. In one embodiment, pervasive computing environment 600 includes a scenario whereby there are two persons (user 1 and user 2) having different data wrappers specific to their needs. User 1 does not allow any data outside a specified purpose to be shared publically except to those devices that negotiate the use within the negotiation parameters set forth by the user, while user 2 has present applications that are allowed to be showed publically. At step 702 user 1 and user 2 approach computer 1 614.

As illustrated in FIG. 6, computer 1 has an authentication detection device 612 that in this scenario is on communication with user 1 authentication device 616, and user 2 authentication device 618. At 702 sensor data from computer 1 is intercepted by user 1 authentication device 616, and user 2 authentication device 618. At 703, data security and privacy rights are determined for user 1 and user 2. At 704, the purpose of the data collection is interpreted and negotiated according to the negotiation parameters set forth by user 1 and user 2. Dynamically, at 705, the determination of the data needed from the interaction by the computer is determined and a strategy is agreed to as to the use of the data collected. In this example, if the negotiation is successful, at 712 since user 1 does not allow any access but that specified, only the data allowed to be shown publically is presented. However, since user 2 has a more relaxed policy, user 2's data is shown immediately on computer 1 without any further negotiations as shown at 630.

Figure 8:
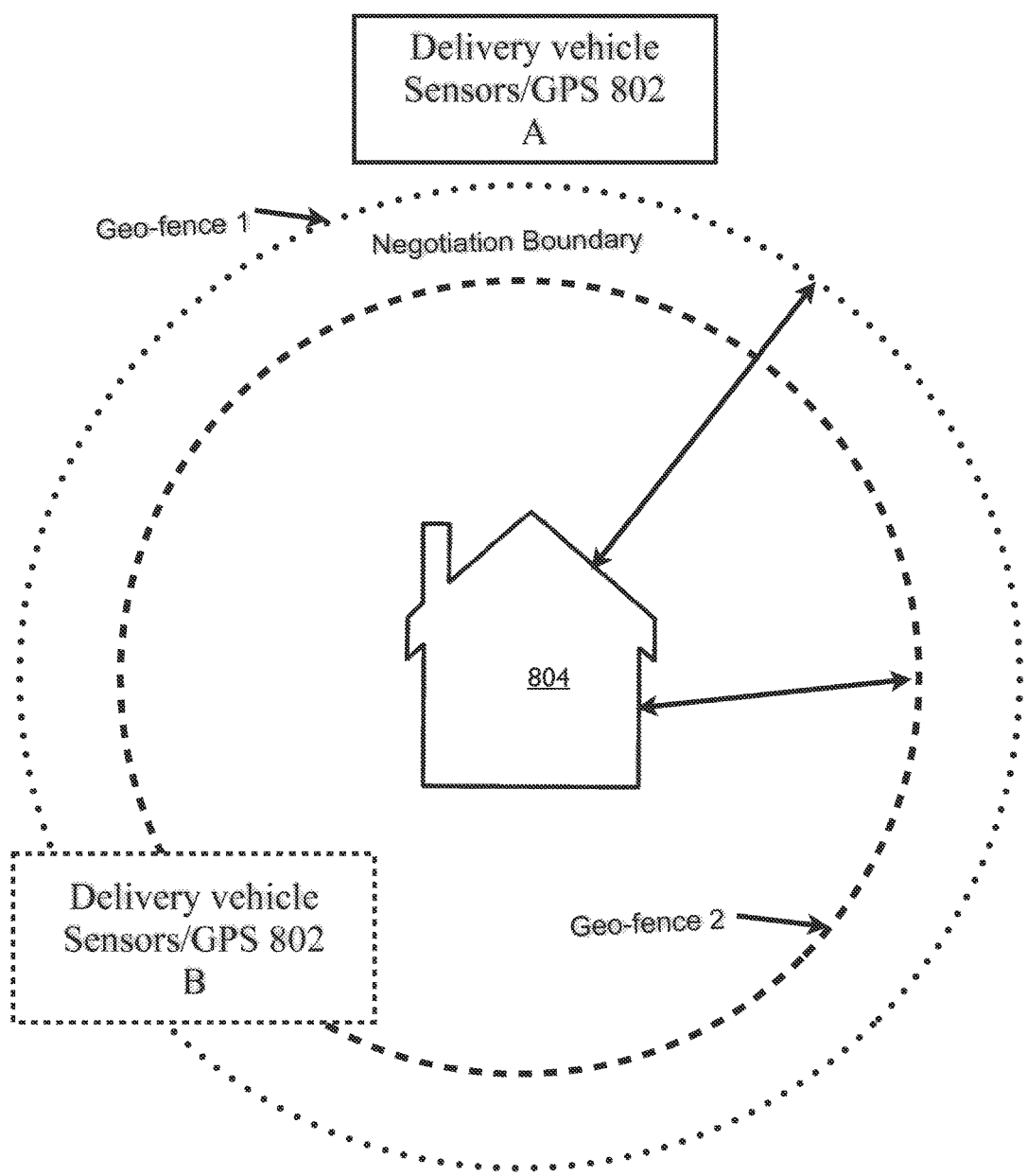
FIG. 8 illustrates a block diagram example of a privacy aware scenario in accordance with some embodiments.

In other embodiments, using the data wrapper and negotiation parameters as described herein, without a negotiation, the data collected would be stopped until a negotiation settlement is reached. For example, referring to FIG. 8, consider the case of a camera or other sensing device as part of a vehicle 802 used to help deliver a package to a home. The delivery may be accomplished using a parcel delivery service or other means such as a drone or helicopter. As the vehicle 802 approaches a home 804 at position A, the vehicle encounters a geo-fence, in this example geo-fence 1. At this juncture, the data wrapper may be employed to initiate the negotiation between the person or entity controlling the access to the sensor data of the approaching home such as the route taken, the location, the house color, video of house, and the third party controlling sensor data usage and egress to and from the vehicle. In some scenario, a default minimum subset of data is used for the delivery such as path, and obstacle avoidance. When the delivery is complete, all or some of the data collected may be destroyed in accordance to the parameters. For example, if the data being collected will be used by a third party company to produce street maps showing the person's home publically, and such data usage was prohibited by the person or an entity, such data wrapper may be used to tag and provide verification that such data will be destroyed. In other scenarios, a second or third geo-fence may be used to set up a negotiation zone such that the data collected my be used for some purposes related to the vehicle proximity to the zone, and for example, to provide an access corridor to the delivery vehicle to enforce that certain data may not be collected under the negotiation agreement parameters.

In other embodiments, using the data wrapper and negotiation parameters as described herein, without a negotiation, the data collected would be stopped until a negotiation settlement is reached.

Figure 9:
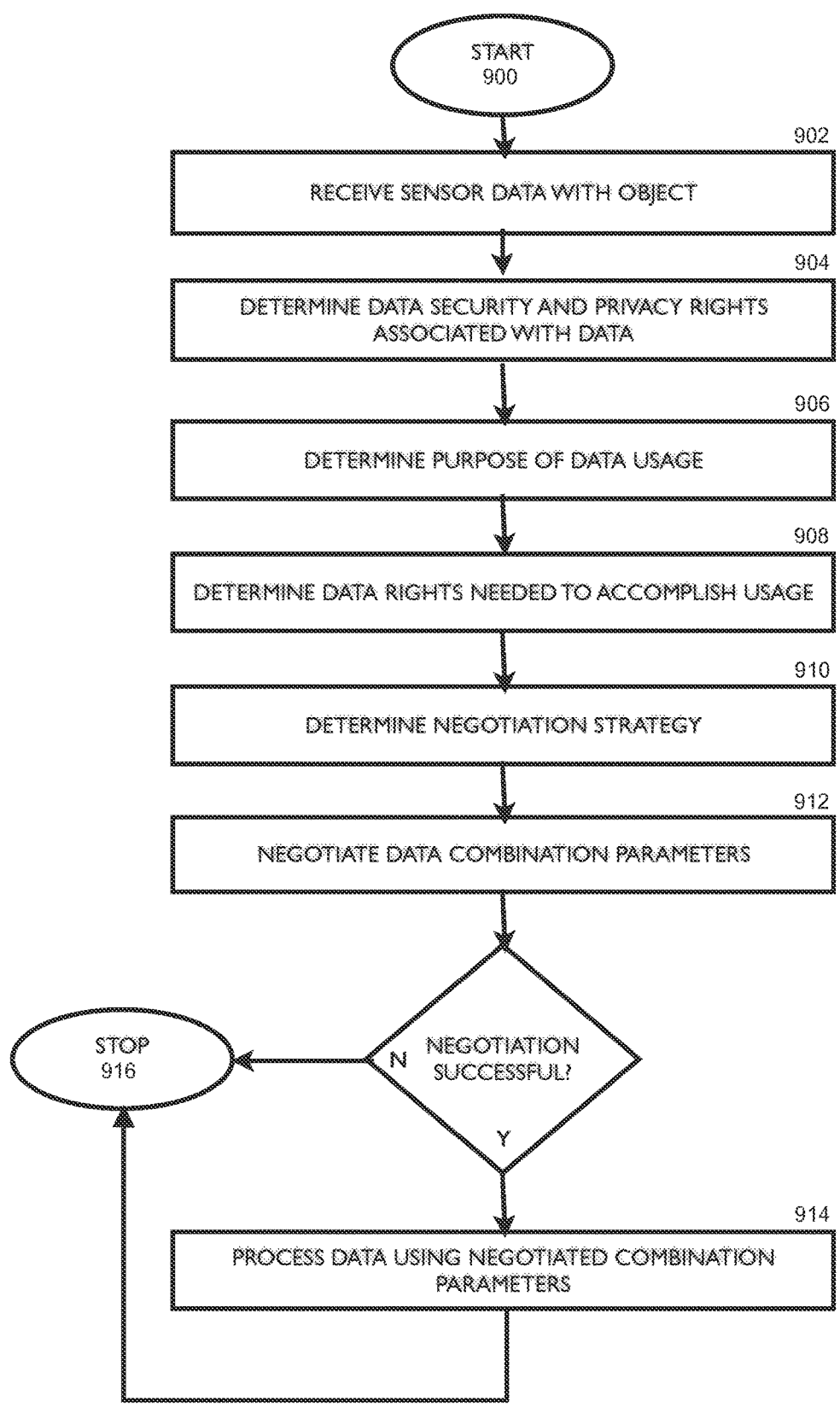
FIG. 9 illustrates a method for autonomous actor data processing in accordance with some embodiments.

FIG. 9 illustrates a method 900 for negotiating the use of sensor data collected by sensors on drones or associated with geo-fences. In one embodiment, includes a scenario whereby there are two autonomous actors (actor 1 and 2) having different data wrappers specific to their needs. Actor 1 might manage a territory and does not allow any data outside a specified purpose to be shared publically except to those devices that negotiate the use within the negotiation parameters set forth by a programmer of actor 1, while actor 2, might be an autonomous vehicle programmed to carry out an action and accept a selection of negotiated deviations from that action. At step 902 actor 1 and user 2 make contact using communicative sensors. At 904 actor 2 determines the identity, location of actor 1 and rights associated with that identity/location. At 906, actor 1 determines what actor 2 intends to do with data collected while in the territory managed by actor 1. At 908, each actor determines what the other's desired programming seeks dynamically. For example, actor 1 may request a specified monetary amount from actor 2 and actor 2 may be configured to offer a monetary amount to continue the programmed action. These amounts could be programmed to include an acceptable range of values. At 910, and 912 the determination of the data needed from the interaction by the computer is determined and a strategy is agreed to as to the use of the data collected. In this example, if the negotiation is successful, at 914 actor 1 does receives an acceptable monetary amount and access to the territory is granted to actor 2.

Hardware Support and Disclaimers

Figure 10:
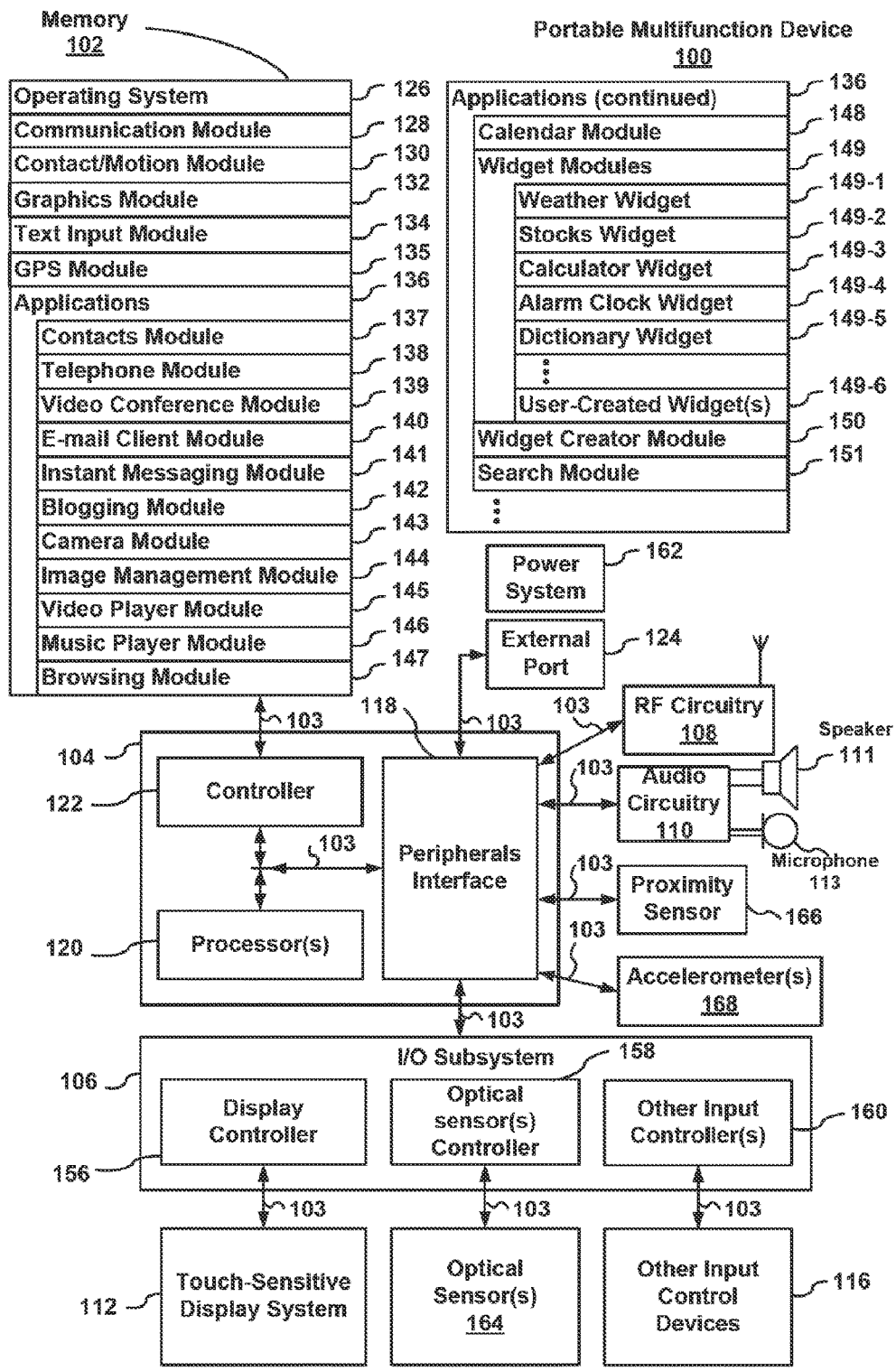
FIG. 10 is a block diagrams illustrating a portable multifunction devices with touch-sensitive displays in accordance with some embodiments.

Attention is now directed towards embodiments of the device. FIG. 10 is a block diagram illustrating portable multifunction device 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIG. 10 may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoiP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack. The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons may include an up/down button for volume control of the speaker 111 and/or the microphone 113. The one or more buttons may include a push button. A quick press of the push button may disengage a lock of the touch screen 112 or begin a process that uses gestures on the touch screen to unlock the device. A longer press of the push button may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIG. 10 shows an optical sensor 164 coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIG. 10 shows a proximity sensor 166 coupled to the peripherals interface 118. Alternately, the proximity sensor 166 may be coupled to an input controller 160 in the I/O subsystem 106. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIG. 10 shows an accelerometer 168 coupled to the peripherals interface 118. Alternately, the accelerometer 168 may be coupled to an input controller 160 in the I/O subsystem 106. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input). The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145; a music player module 146; a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153; and/or map module 154; and/or online video module 155.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth. Embodiments of user interfaces and associated processes using contacts module 137 are described further below.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies. Embodiments of user interfaces and associated processes using telephone module 138 are described further below.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants. Embodiments of user interfaces and associated processes using videoconferencing module 139 are described further below.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143. Embodiments of user interfaces and associated processes using e-mail module 140 are described further below.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS). Embodiments of user interfaces and associated processes using instant messaging module 141 are described further below.

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog). Embodiments of user interfaces and associated processes using blogging module 142 are described further below.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102. Embodiments of user interfaces and associated processes using camera module 143 are described further below.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images. Embodiments of user interfaces and associated processes using image management module 144 are described further below.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124). Embodiments of user interfaces and associated processes using video player module 145 are described further below.

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player. Embodiments of user interfaces and associated processes using music player module 146 are described further below.

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages. Embodiments of user interfaces and associated processes using browser module 147 are described further below.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.). Embodiments of user interfaces and associated processes using calendar module 148 are described further below.

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets). Embodiments of user interfaces and associated processes using widget modules 149 are described further below.

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget). Embodiments of user interfaces and associated processes using widget creator module 150 are described further below.

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms). Embodiments of user interfaces and associated processes using search module 151 are described further below.

In conjunction with touch screen 112, display controller 156, contact module 130, graphics module 132, and text input module 134, the notes module 153 may be used to create and manage notes, to do lists, and the like. Embodiments of user interfaces and associated processes using notes module 153 are described further below.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data). Embodiments of user interfaces and associated processes using map module 154 are described further below.

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 10). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 11:
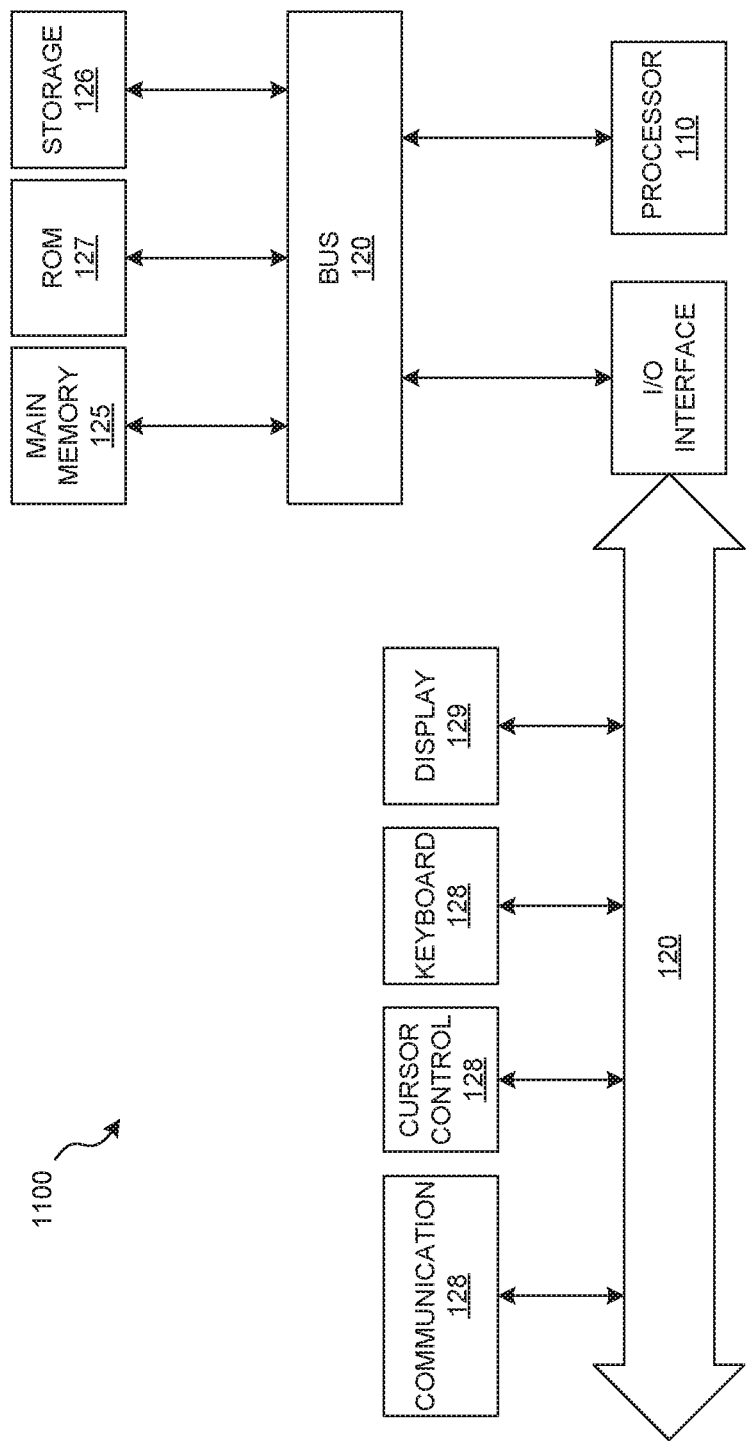
FIG. 11 illustrates an exemplary computer architecture for use with the present system, in accordance with some embodiments.

FIG. 11 illustrates an exemplary computer architecture for use with the present system, according to one embodiment. One embodiment of architecture 1100 comprises a system bus 120 for communicating information, and a processor 110 coupled to bus 120 for processing information. Architecture 1100 further comprises a random access memory (RAM) or other dynamic storage device 125 (referred to herein as main memory), coupled to bus 120 for storing information and instructions to be executed by processor 110. Main memory 125 also may be used for storing temporary variables or other intermediate information during execution of instructions by processor 110. Architecture 1100 also may include a read only memory (ROM) 127 and/or other static storage device 126 coupled to bus 120 for storing static information and instructions used by processor 110. Architecture 1100 further includes user input apparatus 128 and computer output apparatus 129.

References in this specification to "an embodiment," "one embodiment," or the like mean that the particular feature, structure, or characteristic being described is included in at least one embodiment of the present invention. Occurrences of such phrases in this specification do not necessarily all refer to the same embodiment.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Those of skill in the art will appreciate that the invention may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative embodiments may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112, 6 will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

We claim:

1. A method for autonomously negotiating the use of collected data comprising:
   collecting a raw dataset from a data trafficker device, where a data trafficker device is a device which collects and/or records in text, audio, and/or photographic format;
   identifying interested parties to the raw dataset, wherein an interested party is the subject matter of the raw dataset, or has an ownership interest or regulatory rights in the raw dataset;
   identifying, by a computing device, contextual information regarding the raw dataset;
   identifying, by the computing device, transmission protocols used to communicate with a requesting party seeking use of the raw dataset;
   attaching, by the computing device, negotiation policy executable code to the raw dataset including a set of configured parameters corresponding to usage of the raw dataset allowed by the interested parties, wherein the set of configured parameters are also based on the contextual information regarding the raw dataset, and wherein the set of configured parameters are also based on the transmission protocols used to communicate with the requesting party;
   initiating, by the computing device, an autonomous negotiation between the computing device and the requesting party seeking use of the raw dataset, wherein an autonomous negotiation comprises an investigation and response process according to the set of configured parameters to permit the requesting party access and use of the raw dataset based upon results of the investigation and response process, wherein the autonomous negotiation includes:
   determining that the raw dataset includes data associated with a data security wrapper,
   determine a purpose of data collection regarding the data,
   determine data rights to accomplish the purpose,
   determine a negotiation strategy based on the data rights, and
   negotiate data rights based on the negotiation strategy; and
   issuing, by the computing device, a permitted use verdict to the requesting party based on the results of the investigation and response process, wherein the permitted use verdict allows processing of the data based on the data rights negotiated using the negotiation strategy.

2. The method of claim 1, wherein the set of configured parameters dictate that the permitted use verdict would differ based one upon one or more of the following:
   the identity of the requesting party or the use the raw dataset is requested for.

3. The method of claim 1, wherein the permitted use verdict directs that the raw dataset is deleted either after use or after a specified time has elapsed.

4. The method of claim 1, wherein the permitted use verdict directs that the raw dataset is at least partially obscured.

5. The method of claim 1, wherein said identifying interested parties to the raw dataset includes evaluating dataset metadata or digital watermarks to identify interested parties.

6. The method of claim 1, wherein said identifying interested parties to the raw dataset includes employing an internet crawling agent.

7. The method of claim 1, wherein said raw dataset is a credit card transaction and said identifying interested parties to the raw dataset includes evaluating the purchaser information to identify interested parties.

8. The method of claim 1, wherein said raw dataset is identifying information about a person or entity and said identifying interested parties to the raw dataset includes the person or entity identified by the raw dataset.

9. The method of claim 1, wherein said attaching negotiation policy executable code attaches negotiation policy executable code with selected configured parameters based on select content of the raw dataset.

10. An electronic device, comprising:
one or more processors; and
memory storing instructions, wherein the processor is configured to execute the instructions such that the processor and memory are configured to:
collect a raw dataset from a data trafficker device, where a data trafficker device is a device which collects and/or records in text, audio, and/or photographic format;
identify interested parties to the raw dataset, wherein an interested party is the subject matter of the raw dataset, or has an ownership interest or regulatory rights in the raw dataset;
identify contextual information regarding the raw dataset;
identify transmission protocols used to communicate with a requesting party seeking use of the raw dataset;
attach negotiation policy executable code to the raw dataset including a set of configured parameters corresponding to usage of the raw dataset allowed by the interested parties, wherein the set of configured parameters are also based on the contextual information regarding the raw dataset, and wherein the set of configured parameters are also based on the transmission protocols used to communicate with the requesting party;
initiate an autonomous negotiation between the computing device and the requesting party seeking use of the raw dataset, wherein an autonomous negotiation comprises an investigation and response process according to the set of configured parameters to permit the requesting party access and use of the raw dataset based upon results of the investigation and response process, wherein the autonomous negotiation includes:
determining that the raw dataset includes data associated with a data security wrapper,
determine a purpose of data collection regarding the data,
determine data rights to accomplish the purpose,
determine a negotiation strategy based on the data rights, and
negotiate data rights based on the negotiation strategy; and
issue a permitted use verdict to the requesting party based on the results of the investigation and response process, wherein the permitted use verdict allows processing of the data based on the data rights negotiated using the negotiation strategy.

11. The electronic device of claim 10, wherein the set of configured parameters dictate that the permitted use verdict would differ based one upon one or more of the following:
the identity of the requesting party or the use the raw dataset is requested for.

12. The electronic device of claim 10, wherein the permitted use verdict directs that the raw dataset is deleted either after use or after a specified time has elapsed.

13. The electronic device of claim 10, wherein the permitted use verdict directs that the raw dataset is at least partially obscured.

14. The electronic device of claim 10, wherein said identifying interested parties to the raw dataset includes evaluating dataset metadata or digital watermarks to identify interested parties.

15. The electronic device of claim 10, wherein said identifying interested parties to the raw dataset includes employing an internet crawling agent.

16. The electronic device of claim 10, wherein said raw dataset is a credit card transaction and said identifying interested parties to the raw dataset includes evaluating the purchaser information to identify interested parties.

17. The electronic device of claim 10, wherein said raw dataset is identifying information about a person or entity and said identifying interested parties to the raw dataset includes the person or entity identified by the raw dataset.

18. The electronic device of claim 10, wherein said attaching negotiation policy executable code attaches negotiation policy executable code with selected configured parameters based on select content of the raw dataset.

19. A computer program product, comprising one or more non-transitory computer-readable media having computer program instructions stored therein, the computer program instructions being configured such that, when executed by one or more computing devices, the computer program instructions cause the one or more computing devices to:
collect a raw dataset from a data trafficker device, where a data trafficker device is a device which collects and/or records in text, audio, and/or photographic format;
identify interested parties to the raw dataset, wherein an interested party is the subject matter of the raw dataset, or has an ownership interest or regulatory rights in the raw dataset;
identify contextual information regarding the raw dataset;
identify transmission protocols used to communicate with a requesting party seeking use of the raw dataset;
attach negotiation policy executable code to the raw dataset including a set of configured parameters corresponding to usage of the raw dataset allowed by the interested parties, wherein the set of configured parameters are also based on the contextual information regarding the raw dataset, and wherein the set of configured parameters are also based on the transmission protocols used to communicate with the requesting party;
initiate an autonomous negotiation between the computing device and the requesting party seeking use of the raw dataset, wherein an autonomous negotiation comprises an investigation and response process according to the set of configured parameters to permit the requesting party access and use of the raw dataset based upon results of the investigation and response process, wherein the autonomous negotiation includes:
determining that the raw dataset includes data associated with a data security wrapper,
determine a purpose of data collection regarding the data,
determine data rights to accomplish the purpose,
determine a negotiation strategy based on the data rights, and
negotiate data rights based on the negotiation strategy; and
issue a permitted use verdict to the requesting party based on the results of the investigation and response process, wherein the permitted use verdict allows processing of the data based on the data rights negotiated using the negotiation strategy.

20. The computer program product of claim 19, wherein the set of configured parameters dictate that the permitted use verdict would differ based one upon one or more of the following:

the identity of the requesting party or the use the raw dataset is requested for.

21. The computer program product of claim 19, wherein the permitted use verdict directs that the raw dataset is deleted either after use or after a specified time has elapsed.

22. The computer program product of claim 19, wherein the permitted use verdict directs that the raw dataset is at least partially obscured.

23. The computer program product of claim 19, wherein said identifying interested parties to the raw dataset includes evaluating dataset metadata or digital watermarks to identify interested parties.

24. The computer program product of claim 19, wherein said identifying interested parties to the raw dataset includes employing an internet crawling agent.

25. The computer program product of claim 19, wherein said raw dataset is a credit card transaction and said identifying interested parties to the raw dataset includes evaluating the purchaser information to identify interested parties.

26. The computer program product of claim 19, wherein said raw dataset is identifying information about a person or entity and said identifying interested parties to the raw dataset includes the person or entity identified by the raw dataset.

27. The computer program product of claim 19, wherein said attaching negotiation policy executable code attaches negotiation policy executable code with selected configured parameters based on select content of the raw dataset.

* * * * *